May 7, 1963

F. G. LEUTHNER 3,088,179

STERILIZER FOR BULK PRODUCTS

Filed Nov. 13, 1958

INVENTOR.
Frank G. Leuthner

BY

ATTORNEY

INVENTOR.
Frank G. Leuthner
BY
ATTORNEY

INVENTOR.
Frank G. Leuthner 3,088,179
STERILIZER FOR BULK PRODUCTS
Frank G. Leuthner, Gates, N.Y., assignor to Wilmot Castle Company, Brighton, N.Y., a corporation of New York
Filed Nov. 13, 1958, Ser. No. 773,674
8 Claims. (Cl. 21—91)

The present invention relates to method and apparatus for sterilizing with gas at low temperatures, and more particularly to method and apparatus for effectively sterilizing in bulk, very dense, or packed, pulverized products such as powders, flours, and the like.

The use of a gas, such as an ethylene oxide and carbon dioxide mixture, is most effective in sterilizing articles which it has heretofore been impractical to sterilize by the use of steam, because of the deleterious and damaging effect of the extremely high moisture content and heat of the steam. However, with such apparatus as has heretofore been available it has not been practical to sterilize with a gas, such as ethylene oxide, such products as medicinal powders, powdered cocoa, flour, and other granular products.

One of the objects of the present invention is to provide improved methods and apparatus for the gas sterilization of products in bulk.

Another object of this invention is to provide an improved apparatus for the gas sterilization of bulk products which is fully automatic and which thoroughly subjects the product to gas for efficient sterilization.

Other objects of this invention will be apparent from the accompanying drawings, the specification, and the appended claims.

In the apparatus constructed according to this invention, the following method is carried out: a sterilizing gas such as an ethylene oxide and carbon dioxide mixture is introduced into a chamber of a tumbling drum or vessel into which the powdered product has been placed. Prior to the introduction of the sterilizing gas, air is evacuated from the chamber of the rotating drum and a predetermined amount of moisture is introduced to permit the gas to more effectively sterilize the products. After the tumbling products have been exposed to the sterilizing gas for a predetermined period of time, the gas is completely evacuated from the chamber of the rotating drum and purified air is admitted. The degree of humidity, the temperature of the chamber, and the exposure time of the tumbled products to the sterilizing gas is determined in accordance with the individual needs of practice.

In the illustrated embodiment of the invention, a rotatable vessel having a chamber is provided to contain and tumble the products to be sterilized. The sterilizing gas, which is introduced into the drum is stored at a predetermined pressure and temperature in an expansion tank, and a control unit controls the various valves, and switches, gauges, and other apparatus to automatically control the various operations and their sequence for a complete sterilizing cycle.

Figure 2:
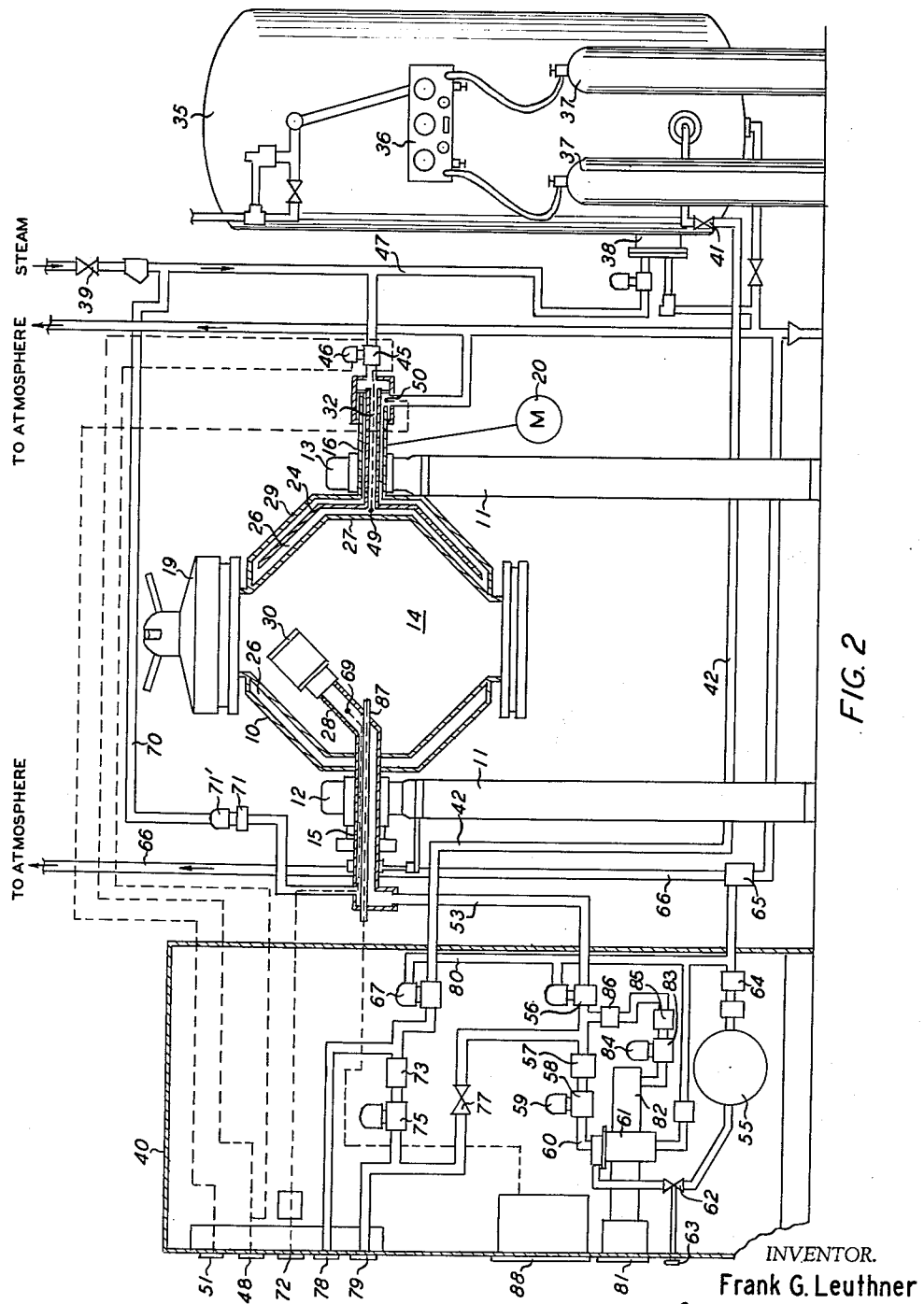
FIG. 2 is a diagrammatic view showing the arrangement and cooperation of the parts illustrated in FIG. 1.

Referring to the drawings, the illustrated embodiment of the invention comprises a drum or vessel 10, which is rotatably mounted on uprights of a base 11 by means of journal bearings 12 and 13. The drum 10 has an interior chamber 14 (see FIG. 2) for holding the products to be sterilized, and which is adapted to be sealed by a removable cover 19. The drum 10 is rotatably supported by hollow trunnions 15 and 16 which axially extend from the drum, and which are journalled in the bearings 12 and 13 respectively. A motor 20 rotates the dum 10 through a chain 22. A jacket 26 having spaced inner and outer side walls 27 and 29 is adapted to hold steam for maintaining the contents in the interior 14 at a constant temperature. A baffle 24 is interposed between the walls 27 and 29 to spearate the intake from exhaust portions of the jacket 26. The hollow trunnion 15 (see FIG. 2) extends into the interior of the drum 10 and bends at an angle to form an extension 28, to which is connected a filter 30. Mounted in trunnion 16 is a coaxial tube 32 which communicates with the intake side of the steam jacket 26 for admitting steam into the jacket. The tube 32 is spaced radially from the trunnion 16 and forms with the inside wall 27 of the jacket 26 so that the steam exhausts from the jacket 26 between the baffle 24 and the outer wall 29 through the space between the tube 32 and the trunnion 16.

The sterilizing gas is supplied in liquid form from cylinders 37. These cylinders are connected to control apparatus 36 for controlling the expansion of the liquid to a gas in an expansion tank 35. This control apparatus may be of the type more particularly described in my United States Patent No. 3,013,573, issued December 19, 1961. A heat exchanger 38 maintains the expanded gas in the tank 35 at the proper temperature. The gas from the tank 35 is supplied to a control unit 40 through a manual valve 41 and a conduit 42.

The temperature in the chamber 14 of the drum 10 is controlled by a solenoid valve 45 which controls the entrance of steam from a pipe 47, which is connected to suitable source of steam at one end, into the chamber 26 through the tube 32. The valve 45 is controlled by a conventional sensing element 49 which governs an adjustable thermostat 48 on the front of the control unit 40. The temperature of the steam exhausting from the chamber 26 is sensed by a sensing element 50 and indicated by a dial thermometer 51 on the front of the control panel 40 so that the operator may determine the operating efficiency of the drum heating system.

The air and gas is evacuated by a vacuum pump 55 from the chamber 14 through the filter 30, the bent arm 28, the hollow trunnion 15, a pipe 53, a one-way relief valve 56, a filter 57, a solenoid valve 58, a conduit 60, a separator 61, a manual control valve 62, which is operated by a handle 63, and into the pump 55. The pump 55 exhausts through a check valve 64, a conventional trap 65, and an exhaust line 66 to the atmosphere.

To render the gas more effective, it has been found that it is desirable to have the chamber 14 of the drum 10 slightly moist before the sterilizing gas is admitted to the drum. This moisture can be supplied by steam from a pipe 70 which leads off the steam line 47. A solenoid valve 71 controls the admission of humidifying steam into the chamber 14 through the trunnion 15; and a sensing element 69 is connected to an indicator 72 for indicating the degree of humidity in the drum.

The gas from the expansion tank 35 enters the chamber 14 through the manual valve 41, pipe 42, a relief valve 67, a solenoid operated valve 75, a manual throttle valve 77, relief valve 56, conduit 53, the hollow trunnion 15, and the filter 30. The relief valve 67 has an outlet leading into a pipe 80 which exhausts gas into the line 66 leading to the atmosphere when the pressure in the expansion tank is excessive. The relief valve 56 also has an outlet leading into the pipe 80 to relieve the chamber 14 of excessive gas pressure. A pressure switch 73 operates in the event the pressure in the expansion tank 35 is below a predetermined minimum, which operation will be hereinafter described. The front of the control unit 40 is provided with a gauge 78 having a conduit which communicates with the pipe 42 leading to the expansion tank 35 for indicating the gas pressure in the expansion tank. There is also a gauge 79 on the unit 40 which constantly indicates the pressure of the gas or the amount of vacuum in the chamber 14 of the drum.

Air is brought into the chamber 14 through a filter 81 past an ultra-violet light 82, a solenoid-operated air intake valve 83, a check valve 85, a throttle valve 86, and into the line 53 and the hollow trunnion 15 through the filter 30. A sensing device 87 mounted in a tube in the hollow trunnion 15 extends into the chamber 14 and serves to operate a recording instrument 88 which provides a permanent record of the pressure, vacuum, and temperature of the chamber over an extended period of time. A more detailed description of the function and method of operation of the various switches and valves in the control unit 40 will be described in connection with the description of a typical operating cycle.

In operation, the powdered product is placed in the chamber 14 of the drum 10, and the cover 19 is securely fastened in place. The motor 20 is then turned on and the drum 10 is rotated in the journals 12 and 13 thereby constantly tumbling and diffusing the packed or powdered product in the chamber 14 of the drum 10. The speed of rotation is governed by the density of the articles to be sterilized and the particular characteristics of the individual particles of the product. In all cases, the speed of the drum must be below that which would cause the product to cling to the sides 27 of the drum because of centrifugal force.

The filter element 30 which prevents the product from entering the trunnion 15, is disposed on the bent arm 28 so that it extends upward away from the central portion of the drum. This position of the filter minimizes the chance of the filter 30 being sheared off or broken during the sterilizing cycle, which would permit the product to be drawn into the control system when the chamber is being evacuated of air or sterilizing gas. This particular construction also permits more of the product to be sterilized in the chamber at one time, and insures that the gas and the air can be introduced and drawn from the chamber in the region where the products are the least dense during rotation.

Figure 1:
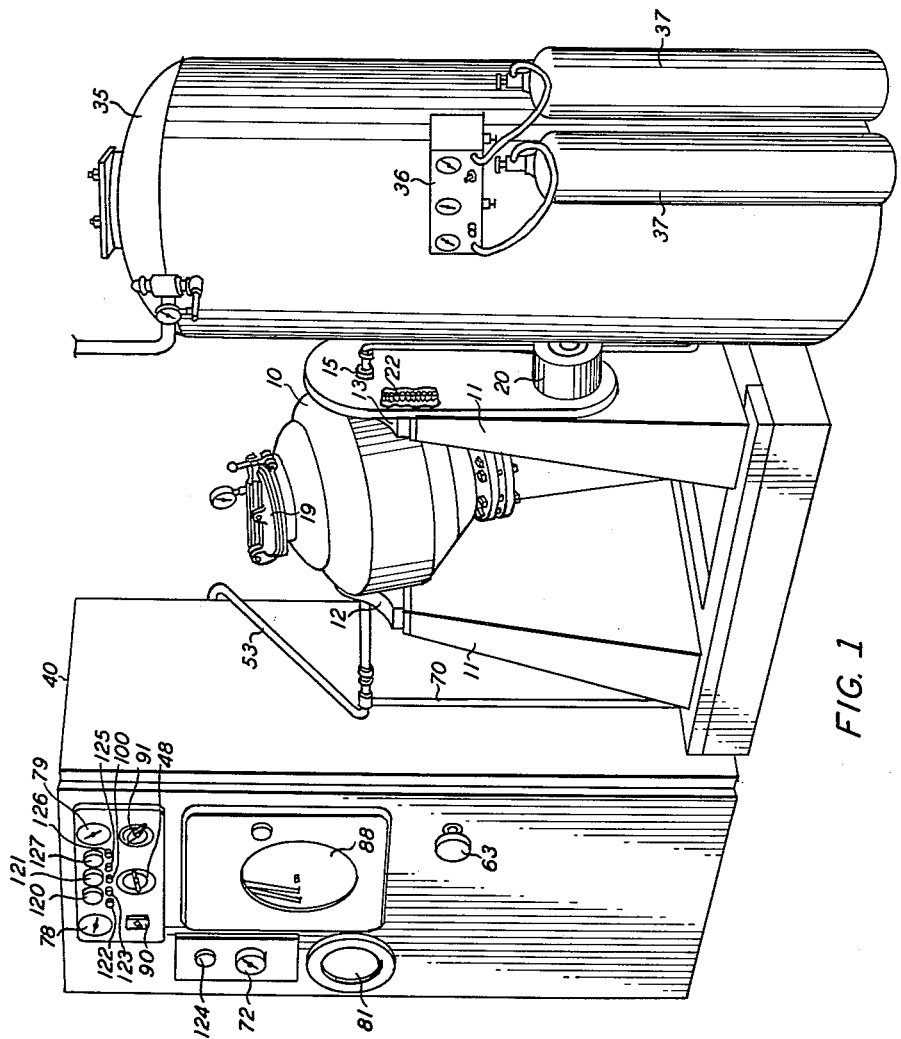
FIG. 1 is a perspective view of the apparatus constructed according to one embodiment of this invention.
Figure 3:
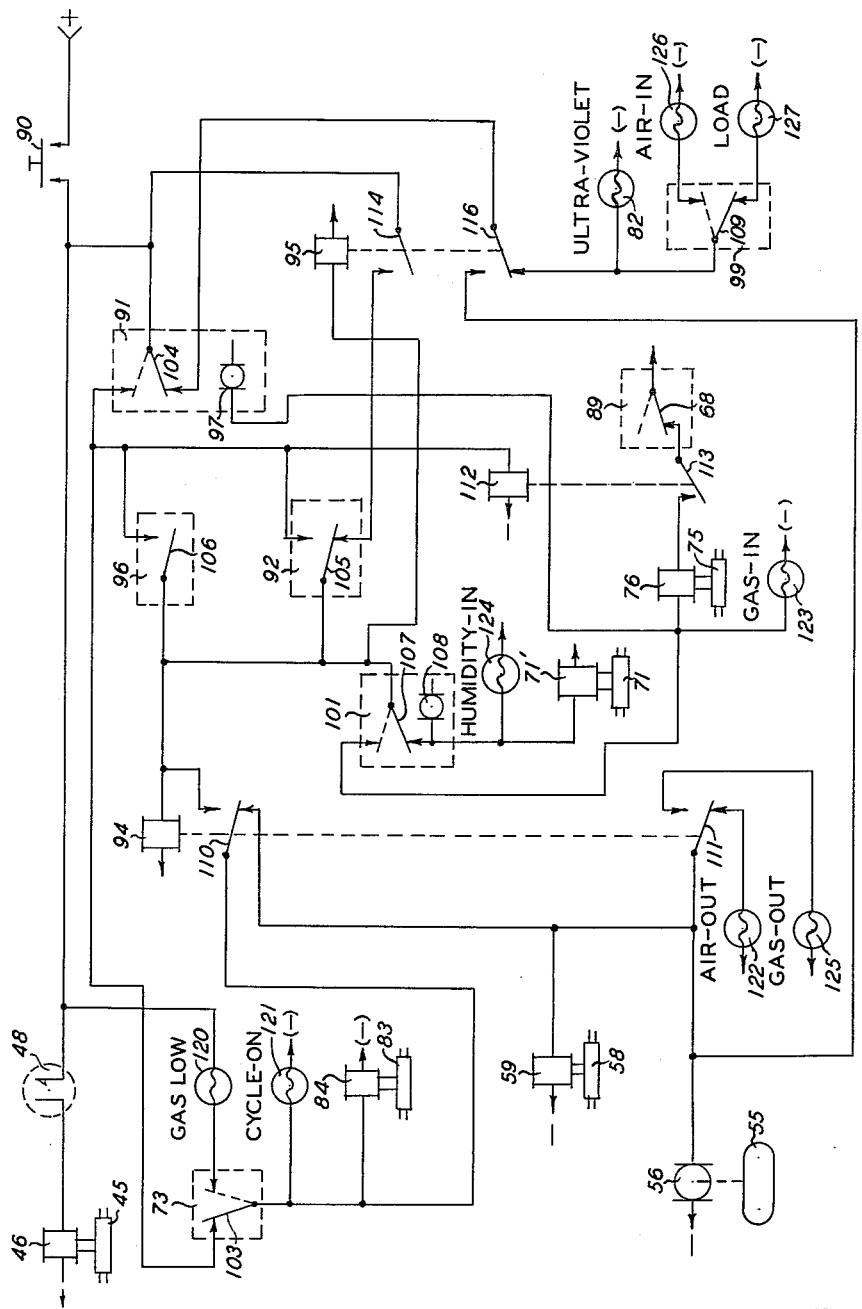
FIG. 3 shows diagrammatically the circuitry and controls for effecting the proper operation of a sterilizing cycle in the apparatus shown.

Referring to FIG. 3, 90 indicates a master switch which is mounted in control unit 40 (FIGS. 1 and 2) and which is closed to commence the operating cycle. The conventional pressure switch heretofore mentioned has a contact 103 which is operable to assume its left hand position (as viewed in FIG. 3) when the pressure of the gas in the expansion tank 35 is above the required minimum, as for example, eighty pounds per square inch, and is operable to assume its right hand position when the pressure in the expansion tank is below its minimum required pressure.

The control unit 40 has a conventional timing device 91 and a conventional timing device 101. The timing device 91 determines the exposure time of the products in the rotating drum to the sterilizing gas. It is provided with a motor 97 which after being energized for a predetermined period of time causes a contact 104 to shift from front to back. The timing device 101 determines the amount of humidifying steam which enters the drum. It has an armature 107 and an operating motor 108 to close its front contact after its motor 108 has been energized for the required length of time.

There is also provided a pressure switch 89, a vacuum switch 92, a pressure switch 96, and a vacuum switch 99. The pressure switch 89 has an armature 68 which opens when the pressure in the chamber reaches thirty pounds per square inch, for example. The vacuum switch 92 has an armature 105 which is operable to close its front contact when the vacuum in the chamber exceeds, for instance, twenty-seven inches. The pressure switch 96 has an armature 106 which is closed when the pressure in the chamber exceeds, for instance, five pounds per square inch; and the vacuum switch 99 has an armature 109 which closes its front contact when the vacuum in the chamber exceeds, for instance, three inches.

Mounted on the front of the control unit 40 are a number of indicator lights to determine the portion of the sterilizing cycle which is in progress, and the conditions in the chamber. A "gas low" lamp 120 is illuminated when the pressure of the expansion tank 35 is below its required pressure. A "cycle on" lamp 121 is illuminated at all times during the operation of the sterilizing cycle. An "air out" lamp 122 is illuminated to indicate that the chamber 14 is being evacuated of air. A "gas in" lamp 123 is illuminated when the sterilizing gas is being introduced into the chamber. A "humidity in" lamp 124 is illuminated when humidifying vapor is being introduced into the chamber. A "gas out" lamp 125 is illuminated when the sterilizing gas is being evacuated from the chamber after the product has been exposed to the gas for a sufficient length of time.

An "air in" lamp 126 is illuminated to indicate that air is being introduced into the chamber 14 after the gas has been evacuated. A "load" and "unload" lamp 127 is provided to indicate that no sterilizing cycle is in progress, and the pressure in the chamber 14 is at atmospheric pressure. Then the cover 19 may be opened with safety to remove the sterilized products or put articles to be sterilized in the device. The adjustable thermostat 48 on the front of the control unit 40 controls the solenoid 46 of the steam valve 45 for regulating the heat to the jacket.

In operation, the product to be sterilized is placed in the chamber 14, and the cover 19 is sealed shut. The motor 20 is turned on to begin rotating the drum, thereby tumbling the products therein.

The manual valve 41 (see FIG. 2) is turned on and assuming that the pressure in the expansion tank 35 is above the required minimum, the arm 103 of the pressure switch 73 shifts to its left hand position as shown in FIG. 3. The timer 91 is then manually operated, so that its arm 104 closes its front contact. The master switch 90 is closed to energize the solenoid 46 of the valve 45 for introducing steam through the trunnion 16 into the jacket 26 of the rotating drum 10 by a circuit which extends from (+) and includes the master switch 90, the thermostat 48 in the closed position, and the winding 46 of the valve 45 to (−). The closing of the master switch 90 also energizes the solenoid 84 to close the air-inlet valve 83 thereby preventing further entrance of air through the trunnion 15 into the chamber 14 of the drum. Simultaneously, the switch 90 energizes the winding 59, thus opening valve 58 and energizes motor of the vacuum pump 55, thereby causing the pump to withdraw the air from the interior of the chamber 14. The winding 84 is energized by a circuit which extends from (+) and includes the closed contact of the master switch 90, front contact 104 of the timing device 91, closed contact 103 of the pressure switch 73 in its left hand position, and the solenoid 84 of the air-inlet valve 83 to (−). It should be noted that if the pressure switch 73 should be in its closed right hand position, the valve 83 will not close because the resistance of the "gas low" lamp 120 connected in series with the winding 84 prevents the solenoid from being sufficiently energized to open the valve. The solenoid 84 is energized by a circuit which extends from (+) and includes the closed contact of the master switch 90, the front contact 104 of the timer 91, the arm 103 of the switch 73 in its left hand position, back contact 110 of relay 94 and the solenoid 59 of the valve 58 to (−). The circuit for energizing the pump motor extends from (+) and includes the closed contact of the master switch 90, the front contact 104 of the timer 91, left hand contact 103 of the switch 73, back contact 110 of the relay 94, and the motor of the pump to (—). Also, upon the closing of master switch 90, the winding of relay 112 was energized by a circuit which caused the closing of its contact 113, the purpose of which will be described hereinafter. It should be noted that the "air out" lamp 122 is illuminated at this time to indicate that air is being evacuated from the chamber 14 by a circuit which includes back contact 111 of relay 94.

When sufficient air has been evacuated from the chamber 14 so that the vacuum reaches approximately twenty-seven inches, the front contact 105 of the vacuum switch 92 closes. The closing of front contact 105, simultaneously energizes the relay 94, energizes the motor 108 of the time delay device 101, energizes solenoid 71' to open the valve 71, thereby permitting steam vapor to enter the chamber 14, and energizes the winding of the relay 95.

The motor 108 of the timing device 101 is energized by a circuit which extends from (+) and includes the closed contact of the master switch 90, front contact 104 of the timer 91, front contact 105 of the vacuum switch 92, timing device 101, and the motor 108 to (—). The circuit for opening the valve 71 extends from (+) and includes the closed contact of the master switch 90, front contact 104 of the timer 91, front contact 105 of the vacuum switch 92, back contact 107 of the timing device 101, and the solenoid 71' of the valve 71 to (—). The relay 95 is energized by a circuit which extends from (+) and includes the closed switch 90, the front contact 104 of the timer 91, front contact 105 of the vacuum switch 92, and the winding of the relay 95 to (—). The circuit for energizing relay 94 extends from (+) and includes the closed switch 90, the front contact 104 of the timing device 91, the front contact 105 of the vacuum switch 92, and the winding of relay 94 to (—). In response to the energizing of the relay 94, the contact 110 is shifted breaking the circuit to the vacuum pump motor and solenoid 59. This closes valve 58. Water vapor now enters the chamber 14 through the filter 30 for a time determined by the timing device 101.

After the chamber 14 has been properly humidified and the predetermined time expires, the contact 107 of the timing device 101 shifts from back to front, thereby deenergizing the motor 108 and shutting off the valve 71 which prevents further entrance of water vapor into the chamber 14. In the event that the vacuum in the chamber should fall below twenty-five inches, for example, during the introduction of humidifying vapor into its interior thereby causing the back contact 105 of vacuum switch 92 to open, the relays 94 and 95 will remain energized by an alternate circuit which includes the front contact 110 of the relay 94.

In response to the closing of the front contact 107 of the time delay device 101, the valve 75 is opened to permit the sterilizing gas to flow through the trunnion 15 and the filter 30 into the chamber 14. The closing of front contact 107 also completes a circuit to energize the motor 97 of the timer 91 for regulating the required time of exposure of the articles in the tumbling chamber 14 to the sterilizing gas. The solenoid 76 is energized by a circuit which extends from (+) and includes the closed switch 90, the front contact 104 of the timer 91, the front contact 105 of the vacuum switch 92, the front contact 107 of the time delay device 101, the winding 76 of the valve 75, front contact 113 of relay 112, which was closed as previously described, and back contact 68 of switch 89, to (—).

The sterilizing gas now enters the chamber 14 from the expansion tank 35 through the trunnion 15 and the filter 30. When the vacuum in the chamber is below twenty-five inches, for example, as caused by the presence of sterilizing gas in the chamber, the valve 75 is held open by a circuit which extends from (+) and includes the closed contact of the master switch 90, front contact 104 of the timer 91, closed contact 103 of switch 73 in its left hand position, front contact 110 of relay 94, the front contact 107 of the time delay device 101, the winding 76 of the valve 75, the front contact 113 of relay 112 and the back contact 68 of the pressure switch 89 to (—). When the pressure of the gas in the chamber reaches five pounds per square inch, for instance, the front contact 106 of pressure switch 96 closes, which provides an alternate energizing circuit for relays 94 and 95, and the winding 76 of the valve 75. It should be noted at this time that the energizing circuit for the relay 95 includes its front contact 114 and the back contact 105 of switch 92. When the sterilizing gas pressure in the rotating chamber 14 reaches thirty pounds per square inch, for instance, the back contact 68 of the pressure switch 89 opens, which breaks the previously described circuit for the solenoid 76 of the valve 75, thereby permitting the valve 75 to close to prevent any further entrance of gas from the expansion tank 35 into the chamber 14. During this period, the rotating chamber 14 contains the sterilizing gas under pressure at thirty pounds per square inch, and the motor 97 remains energized until the predetermined exposure time has elapsed.

After the time has expired for exposing the tumbling products to the sterilizing gas, the contact 104 of the timing device 91 shifts from front to back, which deenergizes relay 112 thereby preventing solenoid 76 from being energized to open the valve 75 when the gas is being evacuated from the chamber, when the pressure in the chamber falls below thirty pounds per square inch thereby causing switch 89 to close its contact 68. The closing of back contact 104 of the timing device 91 energizes the motor of the pump 55 and the solenoid 59 of the valve 58. This circuit extends from (+) and includes the closed master switch 90, back contact 104 of the timer 91, front contact 116 of relay 95 and the motor of the pump 55, to (—); and the winding 59 of the valve 58 to (—), respectively. This causes the gas to be pumped out of the tumbling chamber through the filter 30 and the trunnion 15. The relay coil 94 is still energized thereby energizing the "gas out" lamp 125 by a circuit which includes front contact 111 of the relay 94, to indicate that the sterilizing gas is being evacuated from the chamber.

When the gas in the chamber 14 has been evacuated so that a vacuum of approximately twenty-seven inches exists in the interior thereof, contact 105 of the vacuum switch 92 shifts from back to front. The opening of the back contact 105 of the vacuum switch 92 interrupts the energizing circuit for relay 95, and the previously described energizing circuit for the relay 94. The deenergization of relay 95 causes its front contact 116 to open, which closes the valve 58 and shuts off the pump 55 by interrupting the previously described energizing circuit for the solenoid 59 of valve 58, and the motor of pump 55, respectively. The deenergizing of relay 94 interrupts the previously described energizing circuit for the solenoid 84 of the valve 83, thereby permitting the opening of the valve 83 to admit air into the chamber 14, and conditions the control circuit of the sterilizing system for a subsequent cycle. The deenergization of relay 95 illuminates the ultra-violet lamp 82 and illuminates the "air in" lamp 126 by a circuit, which extends from (+) and includes the closed master switch 90, back contact 104 of the timing device 91, back contact 116 of relay 95, and the lamp 82 to (—). The "air in" lamp 126 is energized through the closed front contact 109 of the vacuum switch 99. When the purified air has reentered the chamber to the extent that the vacuum in the chamber 14 is below three inches, back contact 109 of the vacuum switch 99 closes thereby illuminating the "load" lamp 127 by a circuit, which extends from (+) and includes closed switch 90, back contact 104 of the timing device 91, back contact 116 of relay 95, and the back contact 109 of the vacuum switch 99, and the "load" lamp to (—). At this point the sterile product may be removed from the chamber 14 by shutting off the motor 20 to stop the rotation of the drum, opening the cover 25, tilting the drum 10 on its rotating axis, and removing the contents therefrom. The master switch 90 may be left in a closed condition to energize the solenoid 46 of the steam valve 45 as regulated by the thermostat 48 to maintain the interior temperature of the chamber 14 constant in readiness for another load. The "load" lamp 127 will remain illuminated until the timing device 91 is manually operated, which interrupts the previously described energizing circuit for the lamp 127, as long as the master switch 90 is closed. It should be noted that the time delay device 101 which controls the humidity is reset to close its back contact 107 before beginning a new cycle.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. Apparatus for the gas sterilization of products in bulk, comprising a vessel having a chamber for holding the product to be sterilized, said vessel having trunnions by which said vessel may be rotated extending on opposite sides thereof, said vessel having an inside and outside wall spaced from one another and forming a jacket therebetween, each of said trunnions having a conduit therein, a conduit of one trunnion communicating at one end with said jacket, and the conduit of the other trunnion communicating at one end with said chamber, said one trunnion being connected externally of said vessel to a source of heat, and said other trunnion being connected to a source of sterilizing gas for introducing sterilizing gas into the chamber during rotation thereof.

2. Apparatus for the gas sterilization of a pulverized or powdered product in bulk, comprising a vessel having a chamber for holding the product to be sterilized, said vessel being rotatably mounted on trunnions extending from opposite sides of the vessel, one of said trunnions having a conduit therein, said conduit communicating at one end with said chamber, and a filter covering said one end of said conduit preventing the tumbling product from entering said conduit, said conduit being connectable at its other end to a source of sterilizing gas for introducing gas into said chamber during rotation thereof.

3. Apparatus for the gas sterilization of a pulverized or powdered product in bulk, comprising a vessel having a chamber for holding the products to be sterilized, said chamber having an inside and outside wall spaced to form a jacket therebetween, said vessel being rotatably mounted on trunnions extending from opposite sides of said vessel, each of said trunnions having a conduit therein, one of said conduits communicating at one end with said jacket, said one conduit being connectable to a source of steam for circulating steam into said jacket, the other of said conduits communicating at one end with said chamber, a filter covering the one end of said other conduit preventing the product from entering said conduit, means for evacuating said chamber, means for humidifying said chamber and means attached to said other conduit sequentially evacuating air fom the chamber, humidifying the interior of the chamber, introducing sterilizing gas therein, and evacuating the gas therefrom, all during rotation of the vessel.

4. Apparatus in accordance with claim 3 including a baffle in said jacket separating the intake and exhaust of the jacket steam, thereby providing adequate circulation of the steam within the jacket and satisfactory heating thereof.

5. Apparatus for gas sterilization of a pulverized or powdered product in bulk, comprising a vessel having a chamber for holding the products to be sterilized, mounting means upon which said vessel is rotatably mounted, conduit means extending through said mounting means communicating at a first end with said chamber, a filter on said first end being impervious to said product, a source of sterilizing gas, air pressure reducing means, means selectively connecting said conduit means to said air pressure reducing means and said sterilizing gas source for selectively evacuating said chamber and introducing gas into said chamber through said conduit during rotation of the vessel.

6. Apparatus in accordance with claim 5 in which said conduit means extend upwardly away from the central portion of said chamber to introduce said gas and withdraw air through said filter at a region of the chamber where said product is the least dense during rotation thereof.

7. Apparatus for the gas sterilization of a pulverized or powdered product in bulk, comprising a vessel having a chamber for holding the products to be sterilized, said vessel having trunnions upon which said vessel is rotatably mounted extending from opposite sides thereof, one of said trunnions having a conduit therein communicating at a first end with said chamber, a filter on said first end being impervious to said product, a source of sterilizing gas, a vacuum pump, means selectively connecting said conduit to said vacuum pump and said sterilizing gas source for selectively evacuating said chamber and introducing gas into said chamber through said conduit during rotation of the vessel.

8. Apparatus for gas sterilization of a pulverized or powdered product in bulk, comprising a vessel having a chamber for holding the product to be sterilized; mounting means upon which said vessel is rotatably mounted; conduit means extending through said mounting means terminating at a first end communicating with said chamber above the selected level of the product to be sterilized; a source of sterilizing gas; air pressure reducing means; means selectively connecting said conduit means to said air pressure reducing means and said sterilizing gas source for selectively first evacuating said chamber and secondly, during rotation of the vessel, introducing gas into said chamber through said conduit.

References Cited in the file of this patent

UNITED STATES PATENTS

| | | |
|---|---|---|
| Re. 22,284 | Griffith | Mar. 9, 1943 |
| 1,019,538 | Scott | Mar. 5, 1912 |
| 1,915,242 | Ribeiro | June 20, 1933 |
| 2,112,639 | Underwood | Mar. 29, 1938 |
| 2,189,947 | Griffith et al. | Feb. 13, 1940 |
| 2,531,478 | Smith | Nov. 28, 1950 |
| 2,628,887 | Perkins | Feb. 17, 1953 |
| 2,713,702 | Jewell | July 26, 1955 |
| 2,726,851 | Krupp | Dec. 13, 1955 |
| 2,785,623 | Graham | Mar. 19, 1957 |
| 2,899,266 | Gewalt et al. | Aug. 11, 1959 |

FOREIGN PATENTS

| | | |
|---|---|---|
| 11,555 | Great Britain | Sept. 27, 1906 |